Patented Aug. 20, 1946

2,406,041

UNITED STATES PATENT OFFICE 2,406,041

CHEMICAL PROCESS

Helmuth G. Schneider, Roselle, and James E. J. Kane, Elizabeth, N. J., assignors to Standard Oil Development Company, a corporation of Delaware No Drawing. Application April 20, 1944, Serial No. 531,993

9 Claims. (Cl. 252—42.7)

This invention relates to an improved process of preparing or improving metal derivatives of alkyl phenols or their derivatives, as well as to the products thus prepared and to uses thereof. As a specific instance, the invention relates to the improvement of chemical compounds such as the barium salt of diisobutyl (i. e. tertiary isooctyl) phenol or of the corresponding sulfide or other derivative thereof.

Chemical compounds of the class just referred to have been used as lubricating oil additives, particularly in heavy duty oils used for lubricating high speed Diesel and gasoline engines, for the reason that these additives have excellent detergent properties and improve the performance of the lubricant. They do, however, possess to some extent the undesirable property of being water-sensitive, that is when contacted with a small amount of water, they form a sludge which may remain emulsified in the oil or settle out as a flocculent precipitate. This characteristic of the additive, while not affecting the performance of the oil, is nevertheless undesirable in certain respects such as in storage or handling where the oil is apt to become contaminated with water.

The primary object of the present invention is therefore to treat such additives during the process of manufacture in order to render them water-insensitive so that lubricating oils, or other products in which they may be used, will not tend to emulsify or form sludge when contacted with water.

Before discussing the particular improvements of this invention, the general manufacture of such products will be explained as applied, for example, to the treatment of alkylated hydroxy aromatic compounds, such as a tertiary octyl phenol with a sulfurizing agent, e. g. sulfur dichloride or sulfur monochloride, to form an alkyl hydroxy aryl sulfide which is then converted into a corresponding metal derivative by neutralization, preferably in oil solution, with a basic metal neutralizing agent such as barium hydroxide, thus forming a metal salt of an alkyl hydroxy aryl sulfide. Throughout this specification and the claims the word "sulfide" is used in a generic sense to include monosulfide, disulfide or polysulfide or mixtures of these. Such a process may be illustrated by the reaction of about 2 mols of tertiary octyl phenol with 1 mol, or a slight excess, of sulfur dichloride to produce tertiary octyl phenol sulfide. When preparing the alkyl phenol sulfides on a commercial scale, using technical grades of sulfur dichloride, ratios of 1.5 or so mols of SCl₂ to 2 mols of alkylated phenol will often be found desirable. (The tertiary octyl phenol is readily prepared by alkylating phenol with di-isobutylene in the presence of suitable catalysts.) In practice the phenol sulfide is then usually dissolved in a suitable mineral lubricating oil base stock in about 25 to 50%, usually about 40%, concentration, with or without incorporation of lesser amounts of other additives such as higher aliphatic alcohols, e. g. stearyl alcohol, or aliphatic nitriles, etc. used as defoamers, plasticizers, mutual solvents or as detergency promoters, and finally this solution is neutralized with the desired basic metal compound such as barium hydroxide octahydrate or monohydrate. The resulting product, after filtration, is a mineral oil concentrate of barium tertiary octyl phenol sulfide. Barium tertiary octyl phenol monosulfide may be represented by the general formula Ba[O(C₈H₁₇)C₆H₃]₂S or, if the tertiary octyl group is assumed to be in a position para to the phenolic oxygen, and the sulfur linkage in a meta position, by the following graphic formula:

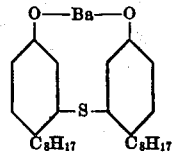

If the sulfur linkage is in an ortho position the graphic formula would be:

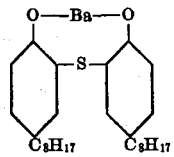

The exact location of the various radicals and linkages in such compounds has not been determined with certainty, but it is probable that the product resulting from the commercial operation of the described process is a mixture of compounds having the radicals and linkages in several different positions, there being for instance some tertiary octyl groups in an ortho position or even in a meta position unless the original tertiary octyl phenol used was an absolutely pure para compound. Also it is more than likely that the commercial product which may be given the general formula Ba[O(C₈H₁₇)C₆H₃]₂Sₙ where $n$ has an average value of at least 1.0 and less than 2.0, contains at least small amounts of disulfide and polysulfide compounds as well as some polymeric material. In any event corresponding compounds may readily be made by starting with ortho or meta alkyl phenols and mixed alkyl phenols may be used with alkyl groups in any two or more positions. If desired, dialkyl phenols may also be used such as 2,4-ditertiary butyl phenol, 2,4-diamyl phenol, 2,6-diamyl phenol, ditertiary octyl phenol, etc. For some purposes it may even be desirable to use alkyl hydroxy aryl compounds having more than two alkyl groups, but the monoalkylated products are preferred, particularly when the final product is desired to have greatest corrosion inhibiting properties.

The invention is considered to apply broadly to substituted metal phenolates or compounds containing at least one grouping having the general formula M—Y—Ar(X)$_n$ where M is a metal, Y is an element in the righthand side of group VI of the Periodic Table (Mendeleeff), Ar is an aromatic nucleus which contains like or unlike substituents, X, $n$ in number, replacing nuclear hydrogen, $n$ being at least one.

M may be any metal such as barium, calcium, aluminum, cobalt, chromium, magnesium, manganese, sodium, nickel, lead, tin, zinc, copper, iron, cadmium, potassium, lithium and the like, polyvalent metal being preferred.

The substitutents, X, may be organic, inorganic, or both. For example, they may be alkyl radicals or groups containing one or more of the nonmetallic elements belonging to groups V, VI, and VII of the Periodic System (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like, or they may be organic radicals containing one or more of the inorganic groups.

In the phenolate salts, if only one of the valences of a polyvalent is connected to a substituted phenolic radical, such as —O—Ar(X)$_n$, the other should be connected to other organic groups or to inorganic constituents. For convenience, non-phenolic radicals or groups, as well as phenolic groups, attached to the metal are indicated broadly by R in the following types of compositional formulae, which broadly represent metal derivatives of substituted phenolic compounds containing the characteristic compositional grouping described:

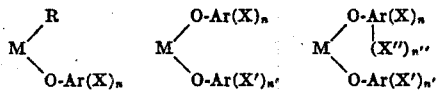

Where oxygen is shown in these formulae it may be replaced by sulfur, selenium or tellurium, as in the case of thiophenolic compounds.

More specifically, some of the structures which substituted divalent metal phenolates may have are indicated in the following list of formulae containing benzene nuclei of compositions —C$_6$H$_4$—, —C$_6$H$_3$—, etc., with X, as before, standing for nuclear substituents, e. g., —C$_n$H$_{2n+1}$, —NO$_2$, —Cl, —S—, —S$_2$—, —NH$_2$,

etc.):

R—M(O—C$_6$H$_4$X)
M(—O—C$_6$H$_4$—X)$_2$
M[—O—(X)C$_6$H$_3$—]$_2$X'
M(—O—C$_6$H$_4$—)$_2$X
M(—O—C$_6$H$_3$(X)—X'$_n$—C$_6$H$_3$(X'')—OH)$_2$
M[—O—(X)C$_6$H$_3$—]$_2$X'$_n$
M[—O—(X)C$_6$H$_3$—]$_2$X''=X''

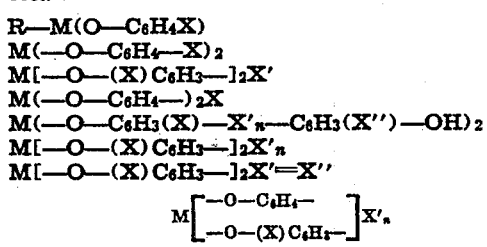

Corresponding monovalent metal derivatives would be:

M—O—C$_6$H$_4$—X
M—O—(X)C$_6$H$_3$—X'
[M—O—(X)C$_6$H$_3$—]$_2$X', etc.

Similarly trivalent or other polyvalent metal derivatives may be used such as:

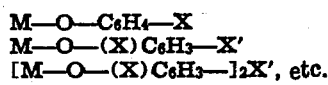

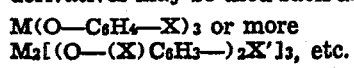

Corresponding metal derivatives of the following illustrative types of substituted phenolic compounds are among those that can be used, in which R represents an alkyl group, preferably having at least 4 carbon atoms:

Group A

HO—C$_6$H$_4$R
HO—C$_6$H$_3$(R)R'
HO—C$_6$H$_2$(R)(R')R''
HO—(R)C$_6$H$_3$—O—C$_6$H$_3$(R)—OH
[HO—(R)C$_6$H$_3$O]$_3$P
HO—(R)C$_6$H$_3$—O—CH$_2$—C$_6$H$_4$—OH
HO—(R)C$_6$H$_3$—CH$_2$—O—C$_6$H$_3$(R')—OH
HO—(R)C$_6$H$_3$—P(OH)—C$_6$H$_3$(R)—OH
HO—(R)C$_6$H$_3$—CH$_2$NH—C$_6$H$_3$(R)—OH
HO—(R)C$_6$H$_3$—CH(Cl)—CH$_2$—C$_6$H$_3$(R)—OH
HO—C$_{10}$H$_6$R
HO—C$_{10}$H$_5$(R)R'

All these compounds when employed in high temperature lubrication service tend to corrode such sensitive engine parts as copper-lead and cadmium-silver bearings. This characteristic can usually be corrected by including, in the lubricating composition, suitable anti-oxidants or other anti-corrosion agents, e. g. benzyl para-amino phenol, alpha naphthol, tertiary amyl phenol sulfide, triphenyl phosphite, dibutyl amine, etc. It may be mentioned that metallic soaps of carboxylic acids are considerably more corrosive than the phenolic salts and that their corrosiveness is less amenable to correction by the use of antioxidants, etc.

However, this corrosion problem can also be at least partially and in most cases completely taken care of by chemically incorporating an element of the sulfur family (i. e. S, Se, and Te), sulfur itself being very effective, into the structure of the substituted phenolate metal salts, thus making unnecessary the addition of any separate anti-corrosion agent. Thus the metal derivatives of the following illustrative types of substituted phenolic compounds are preferred over those listed in Group A above.

Group B

HO—(R)C$_6$H$_3$—S—C$_6$H$_3$(R)—OH
HO—(R)C$_6$H$_3$—S—S—C$_6$H$_3$(R)—OH
HO—(R)C$_6$H$_3$—S(=S)—C$_6$H$_3$(R)—OH

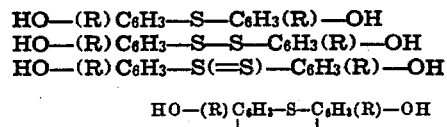

HO—(R)C$_6$H$_3$—S—C$_4$H$_9$ (may be branched or straight chain)
HO—(R)C$_6$H$_3$—S—CH$_2$—C$_6$H$_5$
HO—(R)C$_6$H$_3$—CH$_2$—S—CH$_2$—C$_6$H$_3$(R)—OH
HO—(R)C$_6$H$_3$—S—CH$_2$—C$_6$H$_3$(R)—OH
HO—(R)C$_6$H$_3$—S—(C$_n$H$_{2n}$)—OH
HO—(R)C$_6$H$_3$—S—C$_6$H$_3$(R)—(C$_n$H$_{2n}$)—OH
HO—(OR)C$_6$H$_3$—S—C$_6$H$_3$(OR)—OH
HO—(OR)C$_6$H$_3$—S—C$_6$H$_2$(R')(OR)—OH
HO—(R)(NH$_2$)C$_6$H$_2$—S—C$_6$H$_2$(NH$_2$)(R)—OH
HO—(R)(OH)C$_6$H$_2$—S—C$_6$H$_2$(OH)(R)—OH
HS—(R)C$_6$H$_3$—S—C$_6$H$_3$(R)—OH

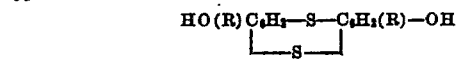

HO—(R)C$_6$H$_3$—S—C$_6$H$_3$(R)—OR
HO—(R)C$_6$H$_3$—S—C$_6$H$_4$—R
HO—(R)C$_6$H$_3$—S—(C$_n$H$_{2n}$)—NH$_2$
HO—(R)C$_6$H$_3$—S—C$_6$H$_3$(R')—R''
HO—(R)(COR)C$_6$H$_2$—S—C$_6$H$_2$(R)(COR)—OH
[HO—(R)C$_6$H$_3$—S—C$_6$H$_3$(R)O]$_3$P
[HO—(R)C$_6$H$_3$—S—C$_6$H$_3$(R)O]$_3$PO

These preferred phenolates may also contain sulfur in other positions or groups at the same time as in the places shown in the formulae in Group B. Furthermore, the formulae in Group A may have sulfur incorporated therein. More broadly it may be stated that inorganic substituents, particularly negative inorganic groups containing non-metallic elements of groups V, VI, and VII of the Mendeleeff Periodic System, beneficially influence the phenolates by increasing their potency for stabilizing the lubricating oils and by making the phenolates, in themselves, more stable, as for instance, against hydrolysis.

Especially preferred, because they are both very efficient and also lend themselves to easy and economical manufacture, are compounds containing at least one grouping having the general formula:

$$\begin{array}{c} M \\ | \\ O \\ | \\ R-Ar-Z_{n''} \end{array}$$

Where Ar is an aromatic nucleus, R is an organic group, Z is a member of the sulfur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkylenyl group, and preferably contains at least 4 carbon atoms but may contian many more, such as 8, 10, 16, 18, 24, etc.

The configurations of the compounds are not limited to certain positions for the substituent groups, for these may be in ortho, para, or meta relations to one another. Also, the substituents, X, in broader formulae discussed previously in any aromatic nucleus may be alike or different.

The aromatic nucleus may be polycyclic as in naphthalene, phenanthrene, diphenyl, etc. Where oxygen occurs, it may be replaced by sulfur, selenium, or tellurium, as in the case of thiophenolic compounds.

An important feature of this invention issues from the observation that metal phenolates are benefited in solubility and effectiveness as hydrocarbon lubricating oil blending agents when they contain a total of at least 8 and preferably 10 or more carbon atoms per molecule in aliphatic groupings, when sulfur is present in the molecule, and at least 16 carbon atoms and preferably 18 or more, if no sulfur is present.

Specific examples of preferred substituted phenolates falling into the classses mentioned, having at least one alkyl radical as a substituent, and using barium as example of a suitable metal, are formulated as follows:

I. Alkyl phenolates $Ba(O-C_6H_4-C_nH_{2n+1})_2$
$Ba[O-C_6H_3(C_nH_{2n+1})_2]_2$ e. g. barium salts of diisobutyl phenol, (p-tert. octyl phenol), octadecyl phenol, and 2,4,ditertiary amyl phenol II. Alkyl chlorphenolates $Ba(O-C_6H_3Cl-C_nH_{2n+1})_2$
$Ba(O-C_6H_2Cl_2-C_nH_{2n+1})_2$
$Ba[O-C_6H_2Cl(C_nH_{2n+1})_2]_2$ e. g. Barium salts of 2 chloro, 4 octadecyl phenol, 2,6-dichloro, 4 diisobutyl phenol, and 6 chloro, 2,4-ditertiary amyl phenol III. Alkyl amino phenolates $Ba\}OC_6H_3[CH_2N(C_2H_5)_2](C_nH_{2n+1})\}_2$ e. g. barium salts of dicyclohexyl amino methyl diisobutyl phenol IV. Thioethers of alkyl phenolates $Ba[O-C_6H_3(C_nH_{2n+1})]_2S$
$Ba[O-C_6H_2(C_nH_{2n+1})_2]_2S$ e. g. barium tertiary octyl phenol sulfide, barium tertiary amyl cresol sulfide, and barium 2,4-ditertiary amyl phenol sulfide V. Disulfides of alkyl phenolates $Ba[O-C_6H_3-C_nH_{2n+1}]_2S_2$ e. g. salts of tertiary amyl phenol disulfide VI. Phosphorus acid esters of alkyl phenol sulfides $Ba_3[O-C_6H_3(C_nH_{2n+1})S(C_nH_{2n+1})-C_6H_3-O]_6P_2$ e. g. salts of tertiary amyl phenol sulfide monophosphite Other examples of metal alkyl phenol sulfide which may be treated in accordance with the present invention include: calcium tertiary amyl phenol sulfide, tin salts of wax alkylated salicylic acid sulfide, magnesium tertiary octyl phenol sulfide, and barium salts of $C_{16}$—$C_{20}$ branched chain alkyl phenol sulfides prepared from phenols alkylated with refinery butene polymers, etc. An example of a trivalent metal alkyl phenol sulfide is aluminum tertiary amyl phenol sulfide which may be represented in a general way by the formula $[(C_5H_{11}-C_6H_3-O)_2S]_3Al_2$ which may be written out more in detail as follows:

$S(C_5H_{11}-C_6H_3O-)_2-Al-O-C_6H_3(C_5H_{11})S(C_5H_{11})C_6H_3-$
$\quad\quad\quad\quad\quad\quad\quad\quad O-Al-(O-C_6H_3-C_5H_{11})_2S$ The alkyl hydroxy aryl compound should have more than three aliphatic carbon atoms and preferably more than 6, such as 8, 10, 12, etc., up to 24 or more as in the case of paraffinic radicals derived from paraffin wax or olefinic polymers, such as dimers, trimers, tetramers, etc., of isobutylene. Branched, especially highly branched, alkyl radicals are preferred.

The aromatic nucleus of the alkyl hydroxy aryl compound may be mononuclear as in the case of a benzene nucleus or polynuclear as in the case of a naphthalene nucleus. Instead of using pure individual phenolic materials, one may use crude commercial products which may be mixtures of two or more alkyl hydroxy aryl compounds, such as crude petroleum phenols which have an average chemical composition indicating the presence of four aliphatic carbon atoms and an amount of oxygen slightly in excess of that called for by the formula $C_4H_9C_6H_4OH$. Similarly crude phenolic materials of coal tar origin may be used such as the so-called tri-cresol which is a mixture of isomeric ortho, meta and paracresols, which should, of course, be further alkylated with a higher alkyl group, for best results from an oil-solubility point of view.

In case of reaction of the alkyl hydroxy aromatic compound with a sulfurizing agent which is preferably a sulfur halide, e. g. $SCl_2$ or $S_2Cl_2$, a small amount of halogen may be found to combine with the aromatic compound in some unknown manner, but the proportion of such combined halogen is very small and is not objectionable.

Before carrying out the neutralization of the alkyl hydroxy aromatic compound for converting the latter into the corresponding metal derivative or salt, the alkylated phenol or sulfide or other derivative thereof is preferably dissolved in a lubricating oil base stock having a viscosity within the approximate limits of 35 to 70 seconds Saybolt at 210° F., and the oil derived from any suitable petroleum crude and having any desired viscosity index.

The basic metal neutralizing agent is preferably a finely divided oxide or hydroxide of the desired metal such as an alkaline earth metal, e. g. calcium, barium, magnesium, etc., or other polyvalent metals such as nickel, cobalt, tin, lead, zinc, copper, cadmium, manganese, iron, chromium, aluminum, etc., or even monovalent metals such as sodium, potassium, lithium, etc. Although the invention is intended to apply particularly to metal salts resulting directly from a basic metal neutralizing agent, it may be used to some advantage in the case of corresponding metal salts made by double decomposition from other corresponding metal salts. For instance, one may first prepare a sodium salt of an alkyl hydroxy aryl sulfide such as tertiary amyl phenol sulfide and then treat the latter with anhydrous barium bromide to form the corresponding barium salt of tertiary amyl phenol sulfide. In such a case the $CO_2$—$H_2O$ treatment may be applied either to the first-formed salt (i. e. the sodium salt) or to the one formed by double decomposition (i. e. the barium salt) or to both.

When using a basic metal neutralizing agent, the reaction is preferably carried out at a temperature between the approximate limits of 20° C. (or room temperature) and about 200° C., preferably about 90° C. to 175° C. The mixture is preferably stirred during this neutralization reaction, for a sufficient length of time to insure complete reaction, and ordinarily an excess of the basic metal neutralizing agent is used so as to insure incorporation of the metal atom in each molecule of the alkyl hydroxy aromatic compound or sulfide thereof, to produce for example a metal alkyl phenolate or a metal alkyl phenol sulfide, etc.

Now according to the present invention the resultant solution of metal salt in lubricating oil, with or without minor amounts of stearyl alcohol or other additives such as mentioned above, is treated with a weakly acid substance, preferably by blowing the solution with a weakly acid gas such as carbon dioxide, hydrogen sulfide, etc., preferably one whose alkali or alkaline earth salts are insoluble in oil, to reduce the water-sensitivity of the metal salt in the oil. Although such blowing with carbon dioxide, for instance, may effect a substantial benefit when used alone, it is preferable to carry out this treatment in the presence of, or subsequent to a treatment with, a controlled amount of $H_2O$ either in the form of water or steam which is believed to effect a partial hydrolysis of some of the metal salts present. It is to be noted that water itself below its boiling point substantially hydrolyzes the metal salts, but during subsequent drying and finishing operations the hydrolyzed fractions recombine to form water-sensitive material. It is the function of the $CO_2$ to render the metal inactive during finishing operations. Accordingly if the hydrolysis is carried out with water alone at temperatures below the boiling point of water, it is necessary to stop the reaction by treating with $CO_2$ prior to the finishing operation. Although the exact amount or proportion of treating agents such as carbon dioxide and steam undoubtedly must be varied to some extent according to the particular type of metal salt being treated and the way in which it was prepared, ordinarily the amount of carbon dioxide, or other weakly acid gas used, should be less than about 25%, and preferably less than 5%, by weight based on the amount of metal salt in the oil solution being treated. If the proportion of carbon dioxide is calculated on the weight of the entire oil solution being treated then it should be preferably about 0.5% to 2% by weight. Similarly the amount of $H_2O$ should be in the same general range, i. e., less than about 20%, preferably less than 5%, based on the weight of metal salt being treated, and preferably about 0.1 to 2 or 3% by weight based on the total oil solution being treated.

The use of controlled amounts of water or steam provides better control of the product and more uniform results than if the blowing with carbon dioxide is carried out in the absence of any $H_2O$. The amount of water or steam used is important. It has been found that there is a slight loss of metal content of the metal salt during the treatment with $CO_2$ and $H_2O$ if used simultaneously and that this loss increases with the amount of $H_2O$ used.

After the treatment with carbon dioxide and steam, or equivalent treating agents, the entire mixture is filtered, preferably with the use of a filter aid such as Hyflo, Dicalite or other inert diatomaceous earths or active clays such as, Super Filtrol, attapulgus, etc. Usually about 0.05 to 0.25 lb. of filter aid per gallon will give satisfactory improvement in the filtration.

The improved process of this invention, namely the treatment with carbon dioxide and steam, or equivalent materials, may be carried out by batch operation or continuously, depending upon equipment available and quantity of material being processed. For batch operation the oil solution of the metal salt can be placed in any suitable container such as an open or closed tank, drum or kettle, etc. provided with heating or cooling coils or exchanger and a pipe or other suitable means of passing the carbon dioxide and steam (or water) into the oil-salt solution preferably near the bottom thereof so that the gas bubbling up through the solution will effect suitable agitation. A mechanical agitator may, of course, be provided. After the reaction has been completed the solution should then be discharged from the bottom of the container by gravity or by pressure blowing, or conveyed by any other suitable means such as by pumping, to a filter. On the other hand, for continuous operation several alternative types of equipment may be used, one being an open vertical drum in which the fresh oil-salt solution is fed in at one side either at the surface or at the bottom or at some intermediate height, and the carbon dioxide and steam are blown into the solution near the bottom of the tank either through a pipe fitted to the bottom of the tank or else through a removable pipe which extends from the top of the tank down through the liquid near to the bottom, and the treated solution is then drawn off through a suitable overflow outlet or by a syphon or otherwise. For larger scale continuous operation it is probably best to use a vertical tower which may be of any desired dimensions of height and diameter and may contain packing materials such as rings, etc., or may be equipped with bubble trays and the like or not, in any case the oil-salt solution being fed into the top of the tower and the carbon dioxide and steam or water being fed into the bottom of the tower so that the solution and treating agents will flow countercurrently and the treated solution will be discharged continuously at the bottom of the tower by gravity and residual gases released at the top of the tower. Or the treatment with $CO_2$ and water (or steam) can be conducted either batch or continuous while maintaining a slight pressure of $CO_2$ or steam on the system. Such pressure will improve the solubility of the $CO_2$ and water (or steam) in the oil, resulting in better contact of the liquid and gas and thereby effecting better utilization of the treating agents.

The data in the following table show the effect of various amounts of water in a series of tests in which a solution of 40% of barium tertiary octyl phenol sulfide in oil was treated with a constant amount (10% by weight/hour based on the total solution) of carbon dioxide at 85–90° C. for various periods of time ranging from ½ hour to 3 hours. The barium salt used in this series of tests was made by neutralizing tertiary octyl phenol sulfide in oil solution with barium hydroxide octahydrate at about 120° C. The percent of barium in the treated product, and the water-sensitivity thereof are shown for each concentration of water used and each duration of carbon dioxide blowing. The term "water-sensitivity" is the amount of sediment that settles out from 500 cc. emulsion after 24 hours standing at room temperature when 600 gms. of a (1.0%) solution of the metal salt in oil is contacted with 1% by weight of water and stirred for 15 minutes with a motor-driven egg-beater type of mixer at 80–90° F.; the oil used in these tests was a solvent extracted Midcontinent lubricating oil base stock of an S. A. E. 20 grade having a viscosity index of about 100.

Table 1

| | ½ hr. | | 1 hr. | | 1½ hrs. | | 2 hrs. | | 2½ hrs. | | 3 hrs. | |
|---|---|---|---|---|---|---|---|---|---|---|---|---|
| | Per cent Ba | $H_2O$ sens. | Per cent Ba | $H_2O$ sens. | Per cent Ba | $H_2O$ sens. | Per cent Ba | $H_2O$ sens. | Per cent Ba | $H_2O$ sens. | Per cent Ba | $H_2O$ sens. |
| Per cent water added: | | | | | | | | | | | | |
| 0 | 9.49 | 12 | | 9 | 9.54 | 7 | 9.54 | 7 | 9.50 | 7 | 9.50 | 7 |
| Trace | 9.68 | 30 | 9.66 | 7 | 9.56 | 10 | 9.00 | 11 | 9.72 | 11 | 9.66 | 11 |
| 1 | 9.41 | 8 | 9.49 | 5 | 9.44 | 1 | 9.32 | 2 | 9.36 | 2 | 9.25 | 5 |
| 5 | 9.17 | 10 | 7.99 | 5 | 7.74 | 5 | 7.34 | 3 | 7.56 | 2 | 7.61 | 2 |
| 10 | 9.47 | 10 | 7.83 | 7 | | | 6.16 | 2 | 6.31 | 1 | 6.33 | 1 |
| 15 | 9.56 | 65 | 8.44 | 17 | 7.50 | 5 | 6.35 | 1 | 6.98 | 1 | 5.07 | 1 |

Blank sample (no treat): 9.65% Barium, 65 c. c. water-sensitivity.

The data in the above Table 1 indicate that the greatest or at least the most practical reduction of water-sensitivity is effected with the use of 1% or less of added water and a carbon dioxide blowing treatment of about 2 to 2½ hours. If much more water is used or a much longer treating time is used, the loss of barium from the finished product is substantially increased, without any compensating advantage by further decrease in water-sensitivity.

In another set of experiments a similar oil solution of the same type of metal salt, namely barium tertiary octyl phenol sulfide, was heated to 150° C. with constant $CO_2$ treatment, and traces of water (steam) were used. By trace is meant less than 0.15% based on the charge. The results were as follows:

Table 2

| ½ hour | | | | 1 hour | | | | 2 hours | | | | 3 hours | | | | 4 hours | | | |
|---|---|---|---|---|---|---|---|---|---|---|---|---|---|---|---|---|---|---|---|
| Per-cent $CO_2$ | Per-cent $H_2O$ | Per-cent Ba | $H_2O$ sens. | Per-cent $CO_2$ | Per-cent $H_2O$ | Per-cent Ba | $H_2O$ sens. | Per-cent $CO_2$ | Per-cent $H_2O$ | Per-cent Ba | $H_2O$ sens. | Per-cent $CO_2$ | Per-cent $H_2O$ | Per-cent Ba | $H_2O$ sens. | Per-cent $CO_2$ | Per-cent $H_2O$ | Per-cent Ba | $H_2O$ sens. |
| 5 | 0 | 9.54 | 8 | 10 | 0 | 9.58 | 9 | 20 | 0 | 9.56 | 10 | 30 | 0 | 9.65 | 5 | | | | |
| 5 | Tr. | 9.29 | 12 | 10 | Tr. | 9.61 | 7 | 20 | Tr. | 9.64 | 10 | 30 | Tr. | 9.50 | 5 | | | | |
| | | | | 0.25 | Tr. | 9.69 | | 0.50 | Tr. | 9.68 | 10 | 0.75 | Tr. | 9.69 | 8 | 1.06 | <.15 | 9.64 | 10 |
| | | | | 0.25 | 0.13 | 9.66 | 9 | 0.50 | 0.26 | 9.77 | 2 | 0.75 | 0.39 | 9.68 | 1 | 1.06 | 0.54 | | 2 |

Blank sample (no treat): 9.65% Ba, 65 c. c. $H_2O$-sensitivity.

The data in the above Table 2 indicate that when the barium salt solution was treated at 150° C., 3 hours treatment with carbon dioxide was sufficient to produce a very substantial reduction in water-sensitivity, from 65 cc. to 8 or 5 cc. when no water was used and from 65 cc. to 12 or 5 cc. when a trace of water (steam) was used disregarding the amount of carbon dioxide. It is further noted that with small percentages of carbon dioxide from 0.5 to 1.0% (by weight on the total solution) as the water (or steam) increases the water-sensitivity improves from the blank of 65 cc. to 1–2 cc. As to Table 2 per se it is evident that larger amounts of steam with relatively small amounts of carbon dioxide are effective in reducing the water-sensitivity to a minimum.

Another series of tests was made using as the metal salt one made by neutralizing tertiary octyl phenol sulfide at 85° C. with barium hydroxide octahydrate, and then treating a 40% solution thereof in oil with carbon dioxide and steam at 150° C. (as in Table 2). The results were as follows:

Table 3

| Time of treat. | | | | | | | |
|---|---|---|---|---|---|---|---|
| ½ hr. | | 1 hr. | | 2 hrs. | | 3 hrs. | |
| Per cent Ba | H₂O sens. | Per cent Ba | H₂O sens. | Per cent Ba | H₂O sens. | Per cent Ba | H₂O sens. |
| Per cent water added: trace | | | | | | | |
| 8.91 | 18 | 9.03 | 13 | 9.00 | 10 | 8.94 | 10 |

The data in the above Table 3 show that here again the carbon dioxide treatment with a trace of steam was successful in reducing the water-sensitivity from 18 down to 10 in 2 to 3 hours.

Some plant performance data showing the effect of steam and carbon dioxide treatment of barium tertiary octyl phenol sulfide are given herebelow:

Table 4

| Water sensitivity | | Percent Ba | |
|---|---|---|---|
| Before CO₂-H₂O treatment | After treatment | Before treatment | After treatment |
| Cc. | Cc. | | |
| 32 | 5 | 9.01 | 8.90 |
| 45 | 7 | 9.68 | 9.67 |
| 45 | 3 | 8.97 | 8.91 |

The above Table 4 shows that in commercial operation which was carried out by injecting the steam-CO₂ mixture into the discharge line of a system which consisted of a vertical drum equipped with a stirrer and a centrifugal circulating pump taking suction at bottom of drum discharging through a heat exchanger into the top side of the drum, the water-sensitivity was successfully reduced from relatively high figures such as 32–45 down to relatively low figures such as 3–7, without effecting more than a trace loss of percent barium. The metal salt used during the accumulation of the data reported in Table 4 was made by neutralizing tertiary octyl phenol sulfide at about 120° C. with barium hydroxide octahydrate, using about 0.7 to 0.75 lbs. of the hydrate per pound of the sulfide, thus being a 0–15% excess of hydrate over the theoretical amount required for neutralization. The subsequent CO₂-steam treatment was carried out at a temperature of about 140–150° C., using about 1.0% CO₂ and about 1.0 to 2.0% steam, based on the weight of the barium salt being treated.

An alternate method of carrying out the water-proofing reaction is to treat the metal salt solution with water alone at temperatures below about 100° C. to effect partial hydrolysis of the salt, then follow this treatment with CO₂ prior to drying and finishing. This type of operation is illustrated in the following example summarized in Table 5.

This experiment was conducted by reacting a 40% metal solution in oil with 15% by weight of water on total solution at 80–90° C. for varying periods of time. In each case the wet solution was quenched with CO₂ prior to heating to 140° C. and filtering. The water-sensitivity data and analyses are as follows:

Table 5

| Time of treatment | Per cent Ba | H₂O sensitivity |
|---|---|---|
| | | Cc. |
| 0 | 9.65 | 65 |
| ½ hr | 9.08 | 65 |
| 1 hr | 9.04 | 40 |
| 1½ hrs | 8.99 | 45 |
| 2 hrs | 9.24 | 11 |
| 2½ hrs | 9.14 | 9 |
| 3 hrs | 9.26 | 6 |

It is not intended that this invention be limited to any of the specific examples which have been given solely for the purpose of illustration nor unnecessarily by any theory suggested as to the mechanism of the operation of the invention, but only by the appended claims in which it is intended to claim all novelty inherent in the invention as well as all modifications coming within the scope and spirit of the invention.

It is claimed:

1. The process of improving the water-sensitivity of a metal salt containing at least one grouping having the general formula $$M\text{---}O\text{---}Ar(R)_n\text{---}Z_{n'}$$

where M is a metal connected through oxygen to an aromatic nucleus Ar containing one or more alkyl substituents R, $n$ indicates the number of such substituents, Z is a member of the sulfur family, and $n'$ indicates the number of Z radicals, which comprises blowing a solution of the said salt in an inert solvent with a weakly acid gas in the presence of H₂O.

2. Process according to claim 1 in which the salt treated contains at least one grouping having the general formula M—O—Ar(R)—S where M is a polyvalent metal connected at least through one oxygen linkage to an aromatic nucleus Ar containing an alkyl substituent R.

3. The process of improving the water-sensitivity of a polyvalent metal salt of a higher monoalkyl phenol sulfide which comprises blowing an oil solution of said salt with a weakly acid gas in the presence of H₂O, and filtering to remove undesirable precipitate.

4. The process for improving the water-sensitivity of a crude polyvalent metal salt of a higher monoalkyl phenol sulfide which comprises blowing an oil solution of said salt with carbon dioxide in the presence of H₂O and filtering to remove undesirable precipitate.

5. Process according to claim 4 in which an amount ranging from a trace to about 5% is used of the CO₂ and of the H₂O, and the treatment is carried out at about 20–200° C. for about 1 to 10 hours.

6. The process of improving the water-sensitivity of a crude barium salt of tertiary octyl phenol sulfide which comprises blowing a 20–60% solution of said salt in mineral oil with about 1% of carbon dioxide and about 1% of steam (based on the weight of solution treated) at a temperature of about 75 to 150° C. for about 2 to 6 hours, and filtering to remove undesirable precipitate.

7. The process of reducing the water-sensitivity of a metal salt of an alkyl hydroxy aromatic sulfide having at least 8 aliphatic carbon atoms which comprises treating a mineral oil solution of said salt with a weakly acid gas in the presence of H₂O.

8. The process of reducing the water-sensitivity of a metal salt of an alkyl hydroxy aromatic sulfide having at least 8 aliphatic carbon atoms which comprises blowing a mineral oil solution of said salt with carbon dioxide in the presence of a small amount of moisture.

9. The process of reducing the water-sensitivity of barium tertiary octyl phenol sulfide which comprises blowing a mineral oil solution of the same with carbon dioxide and steam, using an amount of each ranging from a trace to about 5% based on the solution treated, said treatment being carried out at a temperature of about 20–200° C. for about 1 to 10 hours, and filtering the treated mixture to remove undesired precipitate.

HELMUTH G. SCHNEIDER.
JAMES E. J. KANE.